(12) United States Patent
Hanks et al.

(10) Patent No.: US 9,032,774 B1
(45) Date of Patent: May 19, 2015

(54) LAMINATED FORMING DIES

(71) Applicant: The Boeing Company, Chicago, IL (US)

(72) Inventors: Ryan L. Hanks, Maucoupin, IL (US); Raymond M. Rademeyer, St. Louis Co., MO (US); Larry D. Hefti, Auburn, WA (US); Steve R. McNamara, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/106,386

(22) Filed: Dec. 13, 2013

(51) Int. Cl.
| | |
|---|---|
| *B21D 37/02* | (2006.01) |
| *B21D 37/20* | (2006.01) |
| *B21D 53/00* | (2006.01) |
| *B23P 15/24* | (2006.01) |
| *B21J 13/02* | (2006.01) |

(52) U.S. Cl.
CPC ............... *B21D 37/02* (2013.01); *B21D 37/20* (2013.01); *B21D 53/00* (2013.01); *B21D 37/205* (2013.01); *B23P 15/246* (2013.01); *B21J 13/02* (2013.01)

(58) Field of Classification Search
CPC .......... B21D 3/02; B21D 3/20; B21D 37/205; B23P 15/246; B21J 13/02

USPC ................. 228/262.51, 190, 262.5; 76/107.1; 72/60, 413, 455, 467, 478
See application file for complete search history.

(56) References Cited

U.S. PATENT DOCUMENTS

| | | | | |
|---|---|---|---|---|
| 2,547,168 | A | * | 4/1951 | Nill et al. ...................... 76/107.1 |
| 2,679,172 | A | * | 5/1954 | Clevenger et al. ............ 76/107.1 |
| 5,031,483 | A | * | 7/1991 | Weaver ........................ 76/107.1 |
| 8,079,509 | B2 | * | 12/2011 | Lowney et al. .......... 228/262.51 |
| 8,899,093 | B2 | * | 12/2014 | Beltran de Nanclares Echezarreta et al. ............................ 72/465.1 |
| 8,904,847 | B2 | * | 12/2014 | Shuck .............................. 72/413 |
| 2008/0092622 | A1 | * | 4/2008 | Holmquist et al. ............. 72/478 |

* cited by examiner

*Primary Examiner* — David B Jones
(74) *Attorney, Agent, or Firm* — Toler Law Group, PC

(57) ABSTRACT

One aspect of the disclosure relates to a die comprising a primary plate and secondary plates. The secondary plates comprise through weld holes formed along a direction. The through weld holes of adjacent secondary plates do not overlap when viewed in the direction along which the though weld holes are formed. The primary plate is coupled to at least one secondary plate abutting the primary plate by first welds located in the through weld holes. The secondary plates abutting each other are coupled by second welds located in the through weld holes.

20 Claims, 11 Drawing Sheets

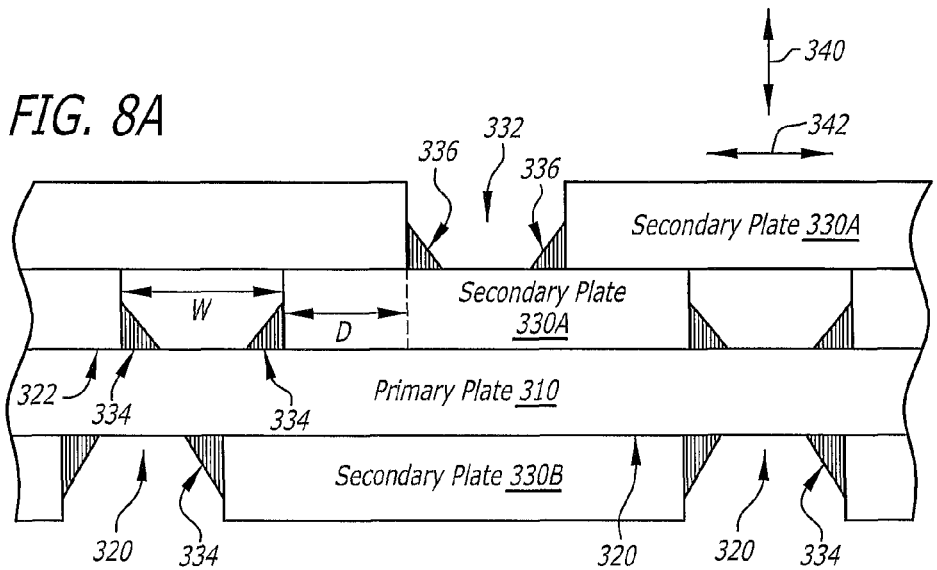
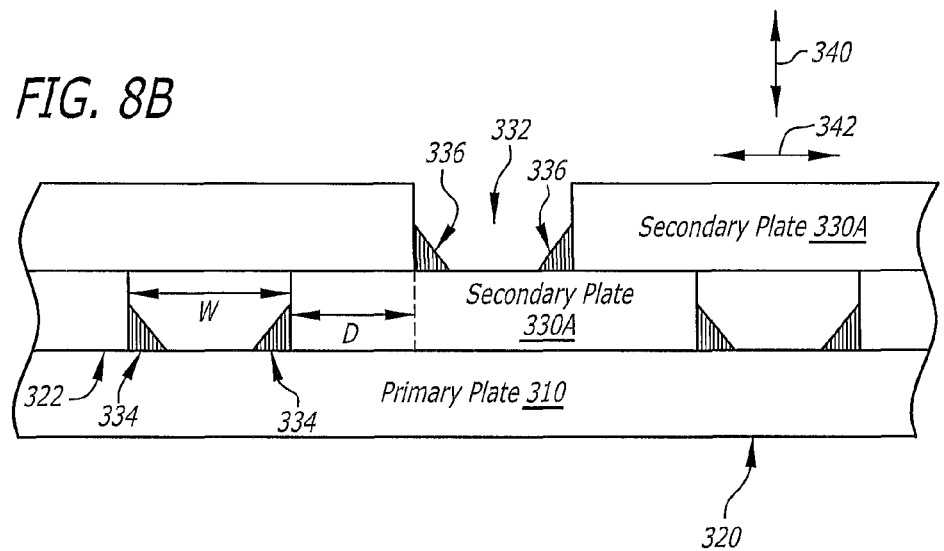

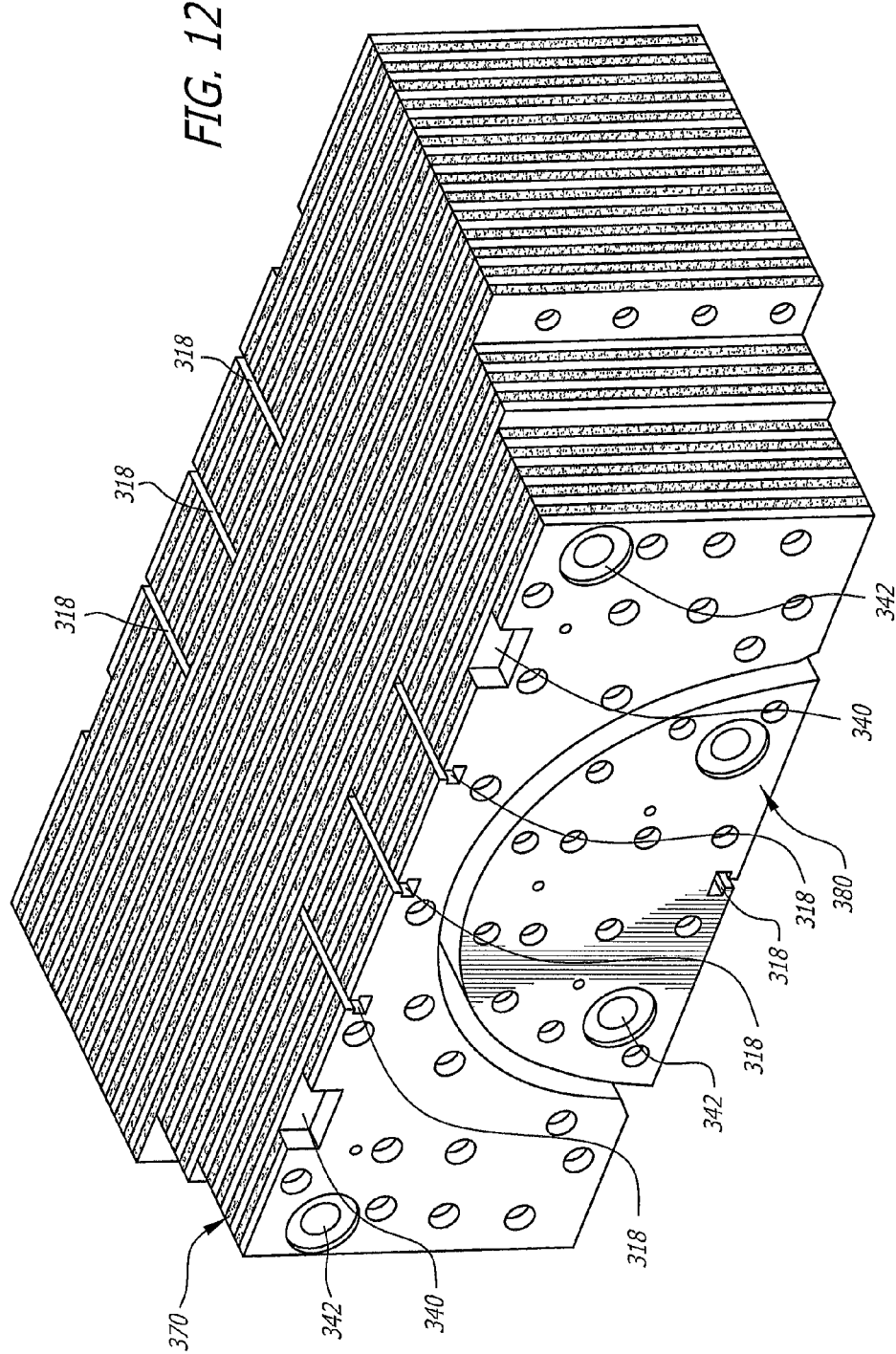

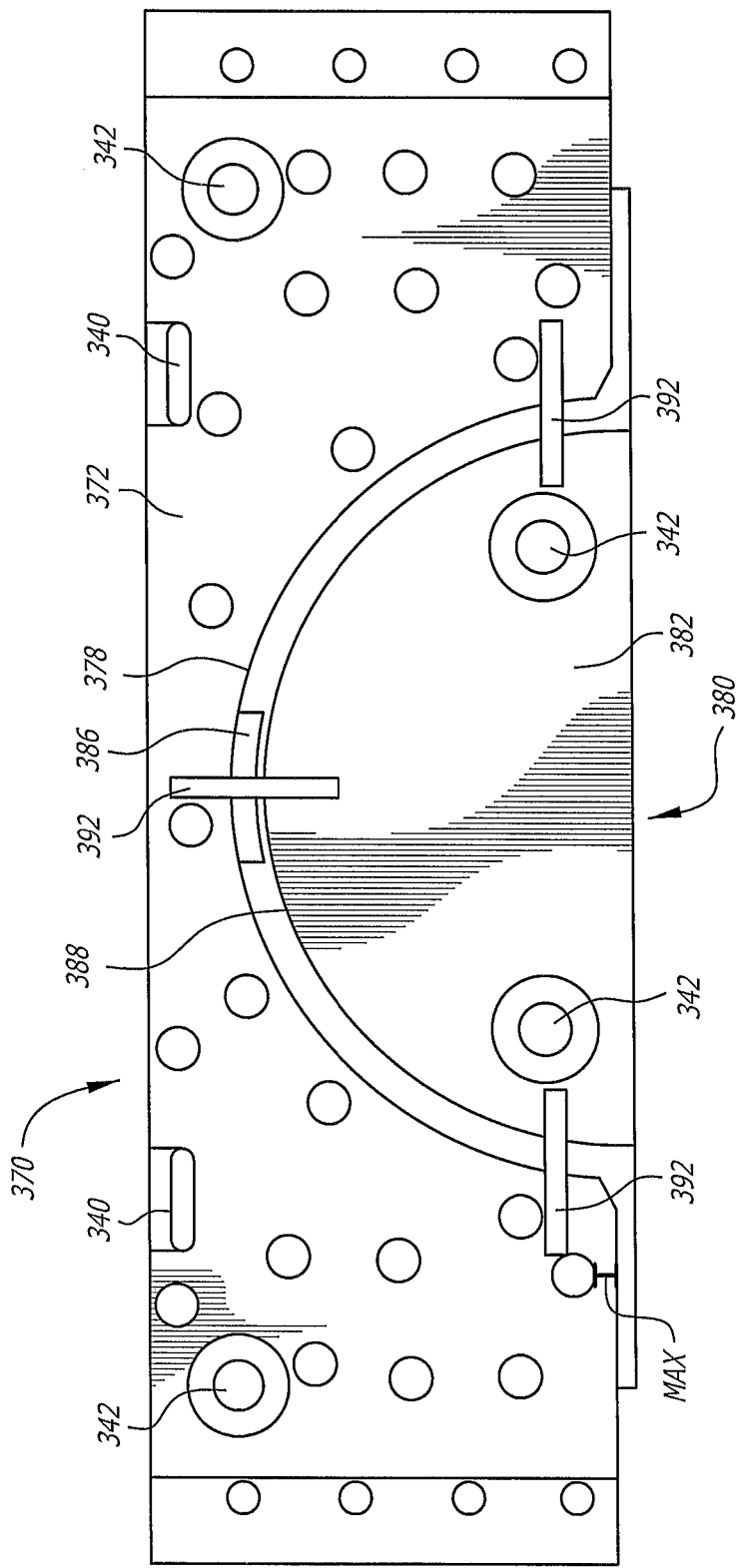

US 9,032,774 B1

LAMINATED FORMING DIES

BACKGROUND

The subject matter described herein relates to manufacturing techniques and, more particularly, to laminated forming dies.

Dies may be used in the formation of large, complex parts, e.g., parts for aircraft or other vehicles. Dies that are formed from a solid block of material are expensive and difficult to manufacture.

SUMMARY

Accordingly, laminated forming dies and methods to make the same may find utility.

One example of the present disclosure relates to a die comprising a primary plate and secondary plates. The secondary plates comprise through weld holes formed along a direction. The through weld holes of adjacent secondary plates do not overlap when viewed in the direction along which the through weld holes are formed. The primary plate is coupled to at least one secondary plate, abutting the primary plate, by first welds located in the through weld holes. The secondary plates abutting each other are coupled by second welds located in the through weld holes.

One example of the present disclosure relates to a method of making a die. The method comprises shaping a primary plate and secondary plates to have predetermined contours and forming weld holes in the secondary plates along a direction, wherein the weld holes of the secondary plates abutting each other do not overlap when viewed in the direction along which the weld holes are formed. The method also includes assembling the die by coupling, in a predetermined order, the primary plate and at least one secondary plate, abutting the primary plate, by first welds located in the weld holes, and the secondary plates abutting each other by second welds located in the weld holes.

BRIEF DESCRIPTION OF THE DRAWINGS

Figure 1:
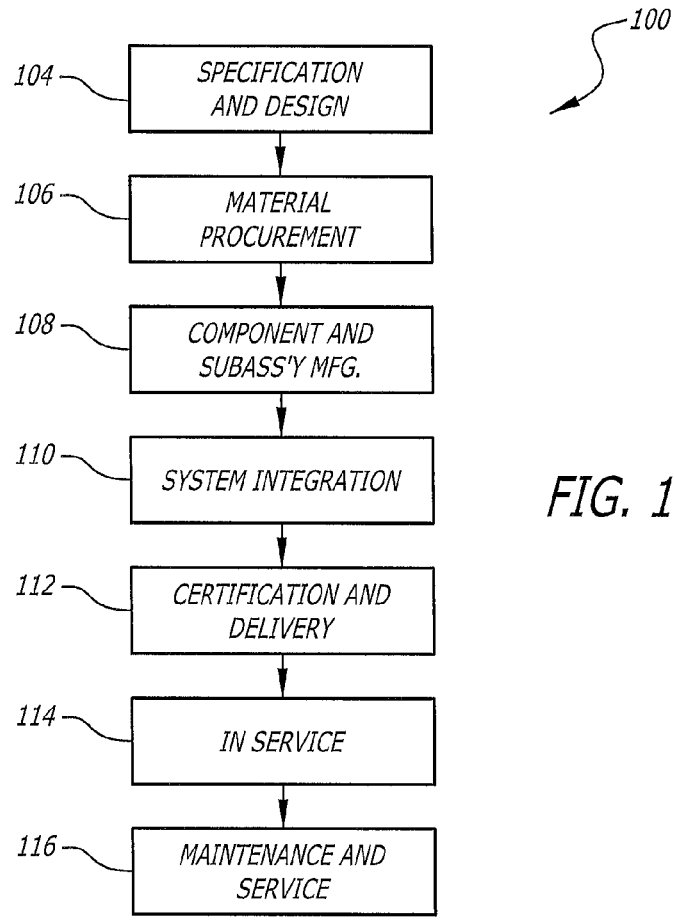

Having thus described examples of the disclosure in general terms, reference will now be made to the accompanying drawings, which are not necessarily drawn to scale, and wherein like reference characters designate the same or similar parts throughout the several views, and wherein:

FIG. 1 is a flow diagram of aircraft production and service methodology.

Figure 2:
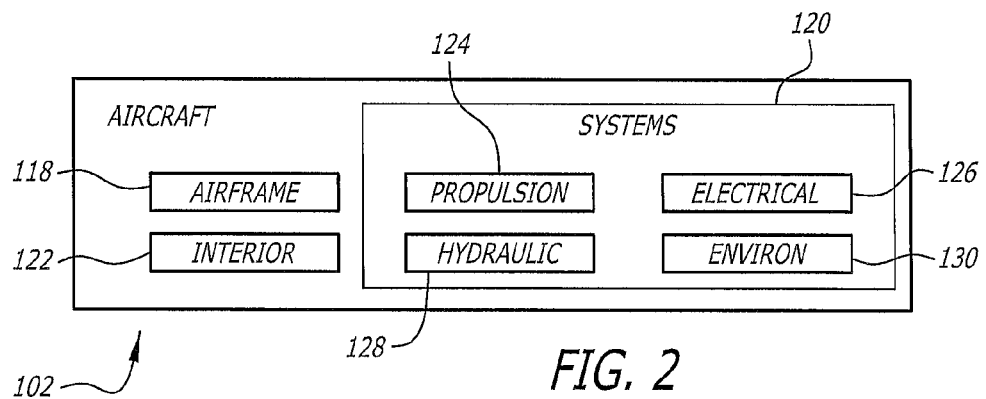

FIG. 2 is a block diagram of an aircraft.

Figure 3:
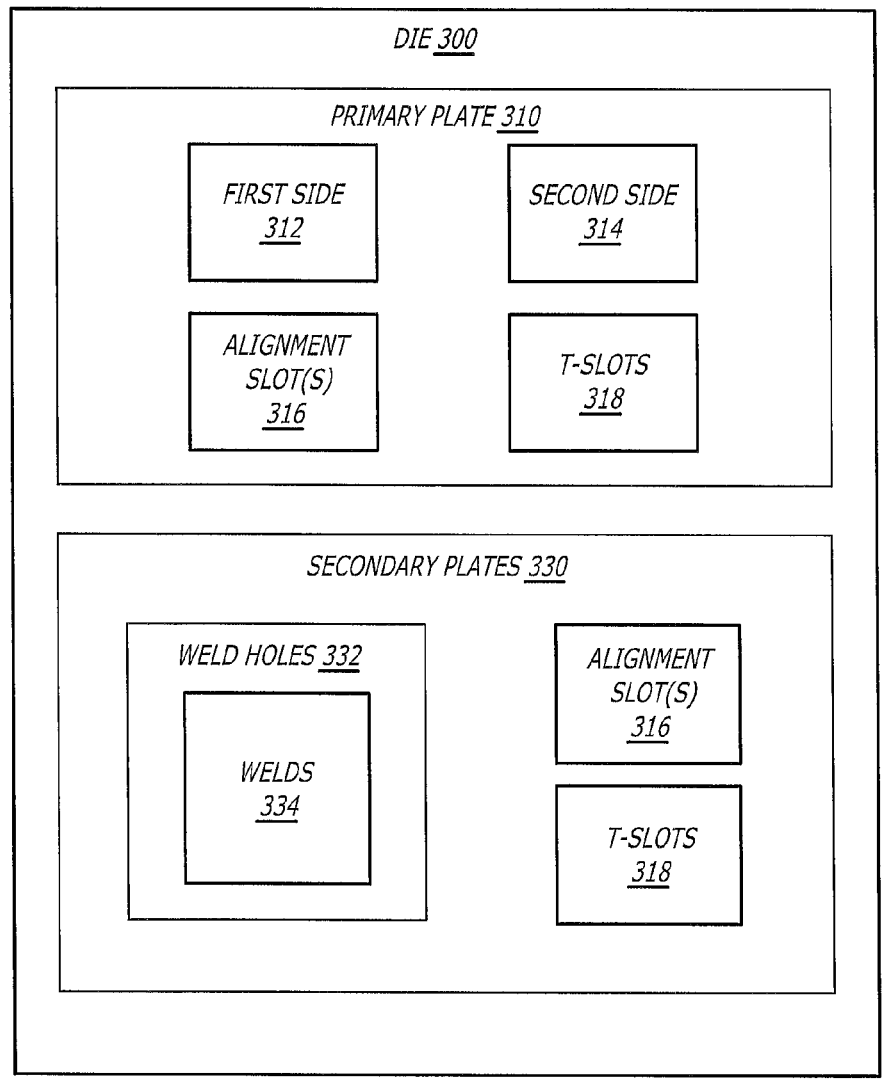

FIG. 3 is a schematic block diagram of a laminated die, according to an aspect of the disclosure.

Figure 4:
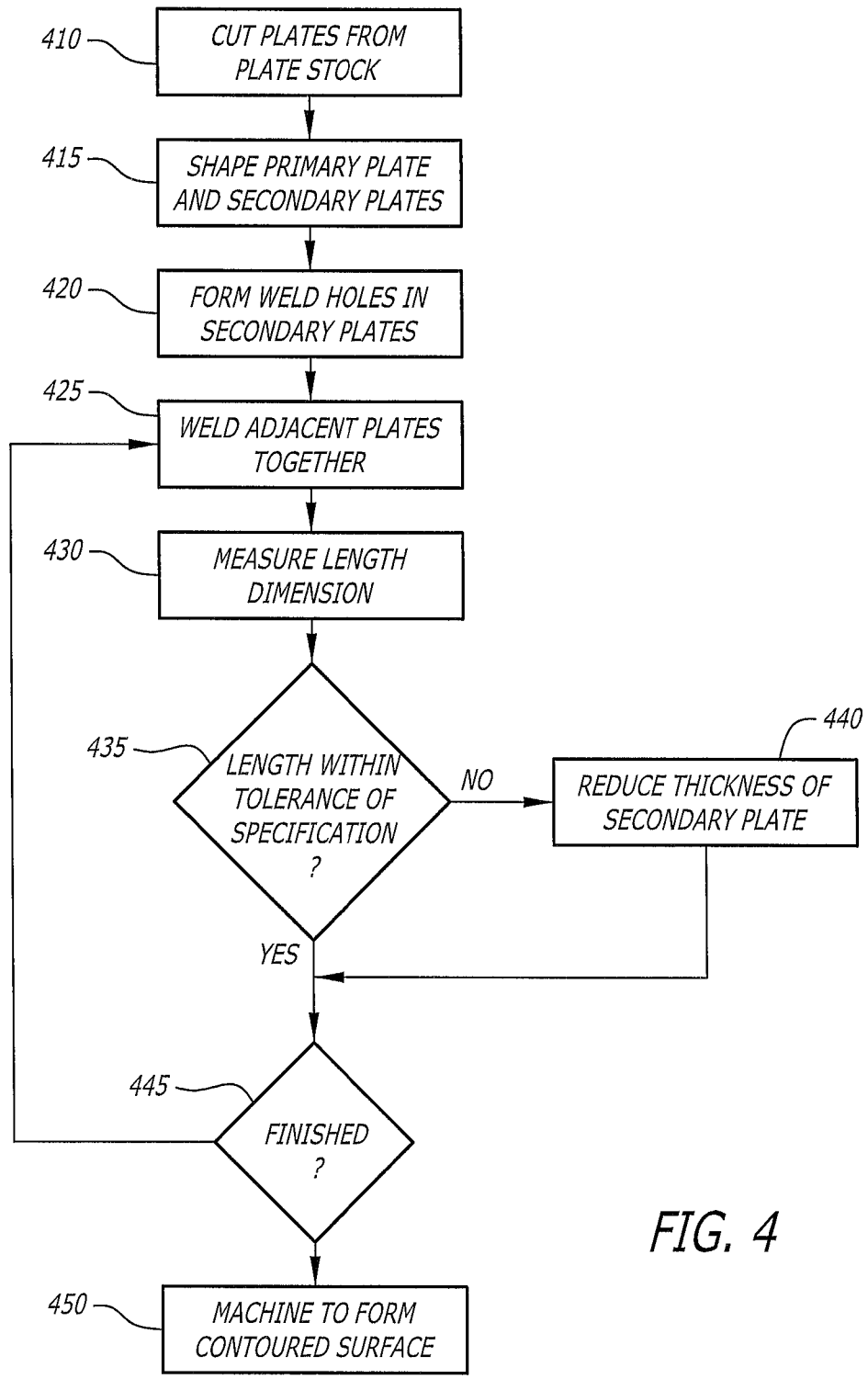

FIG. 4 is a flowchart illustrating operations in a method of making a laminated die, such as a die of FIG. 3, according to an aspect of the disclosure.

Figure 5:
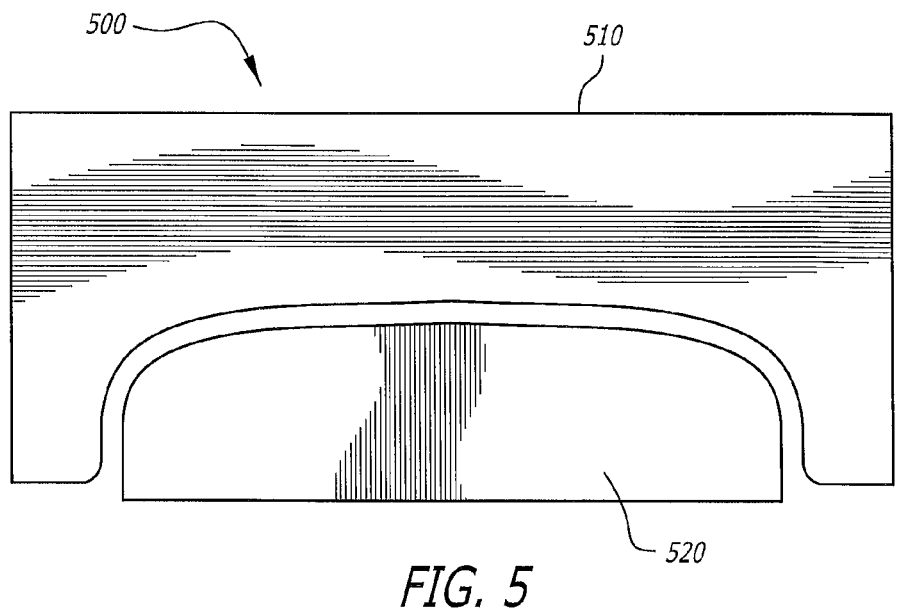

FIG. 5 is a schematic illustration of plate stock for forming an upper portion and a lower portion of the laminated die of FIG. 3, according to an aspect of the disclosure.

Figure 6:
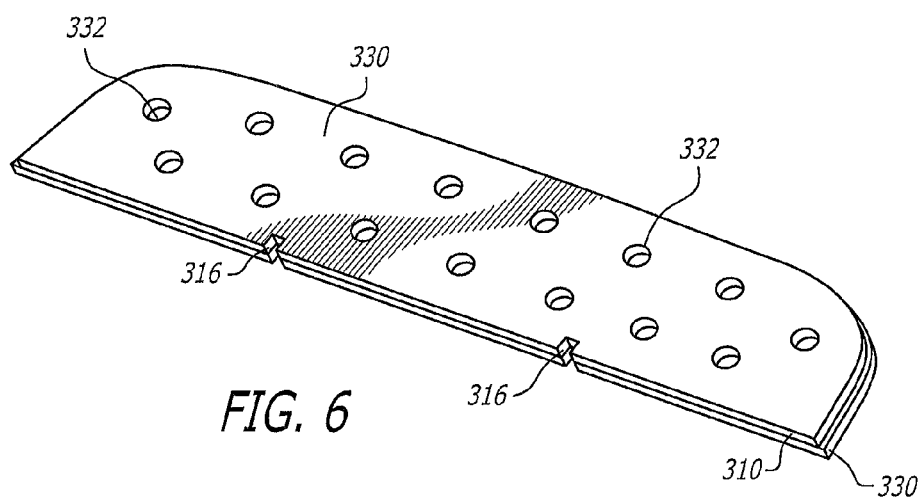

FIG. 6 is a schematic perspective view of a secondary plate of the laminated die of FIG. 3 adjacent a primary plate of the laminated die, according to an aspect of the disclosure.

Figure 7:
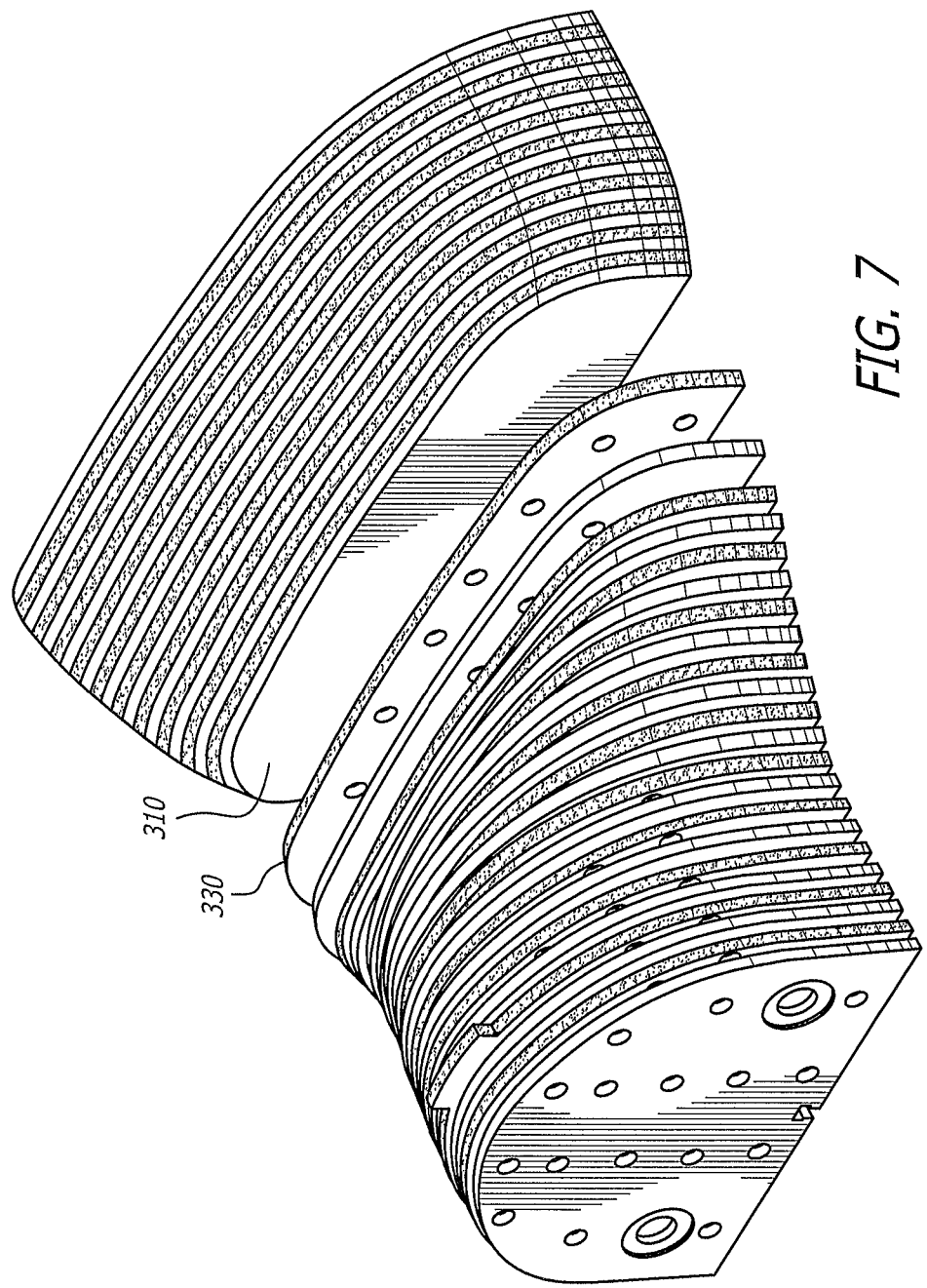

FIG. 7 is a schematic exploded perspective view of a portion of the laminated die of FIG. 3, according to an aspect of the disclosure.

FIG. 8A is a schematic sectional view of the primary plate of, e.g., FIGS. 6 and 7, and two secondary plates disposed on one side of the primary plate, according to an aspect of the disclosure.

FIG. 8B is a schematic sectional view of the primary plate of, e.g., FIGS. 6 and 7, and secondary plates disposed on both sides of the primary plate, according to an aspect of the disclosure.

Figure 9:
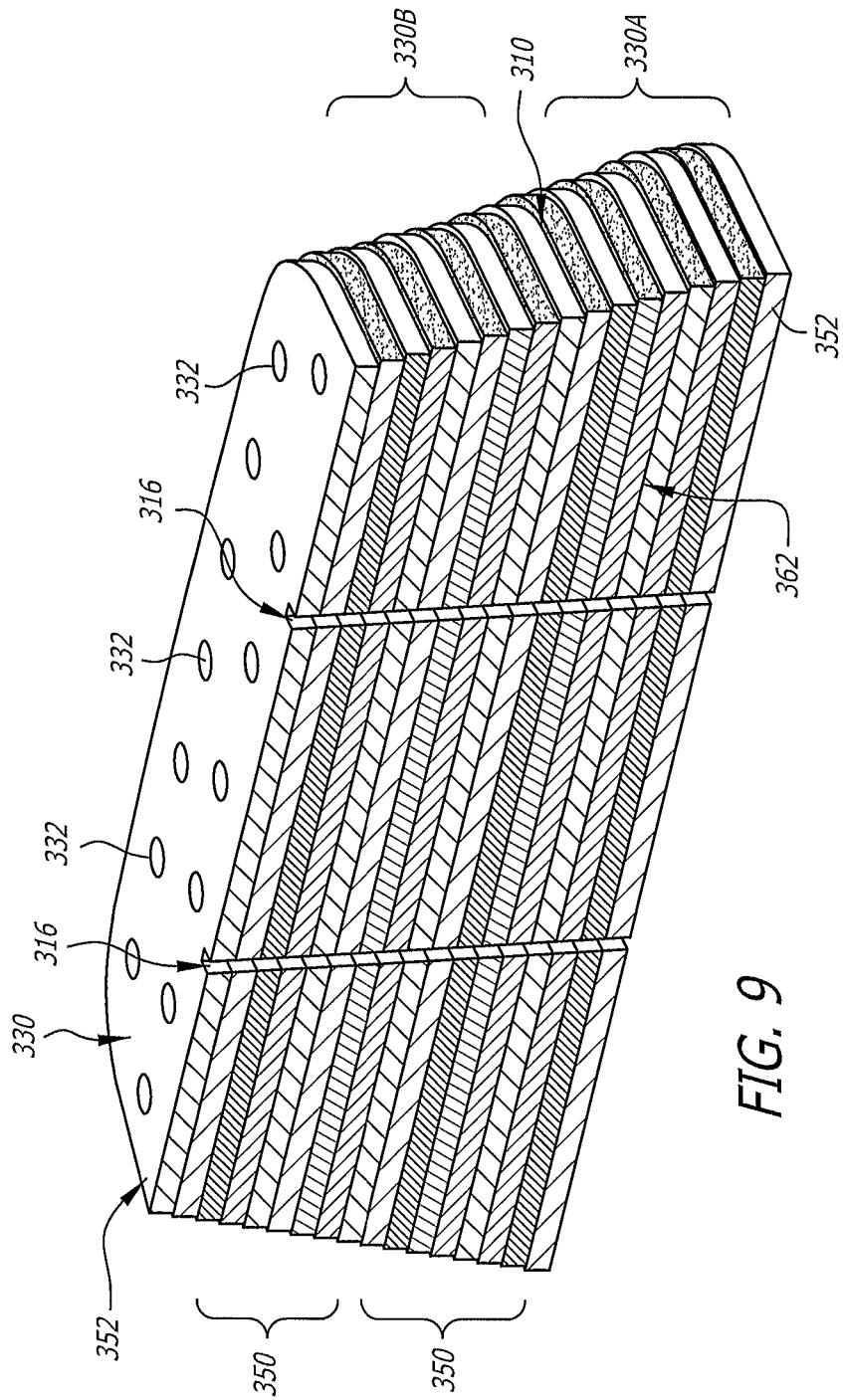

FIG. 9 is a schematic perspective view of a portion of the laminated die of FIG. 3, according to an aspect of the disclosure.

Figure 10:
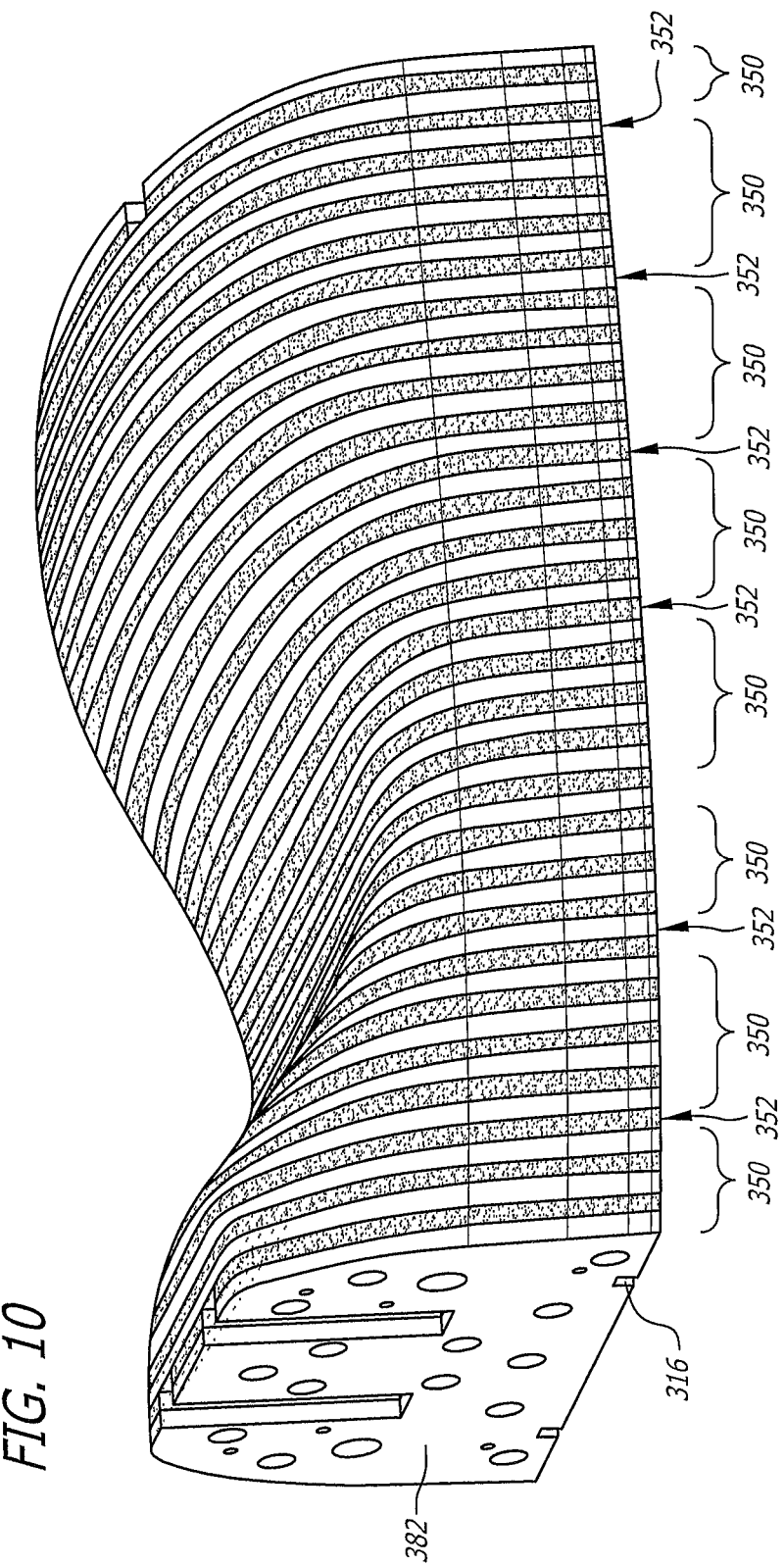

FIG. 10 is a schematic perspective view of the laminated die of FIG. 3, according to an aspect of the disclosure.

Figure 11:
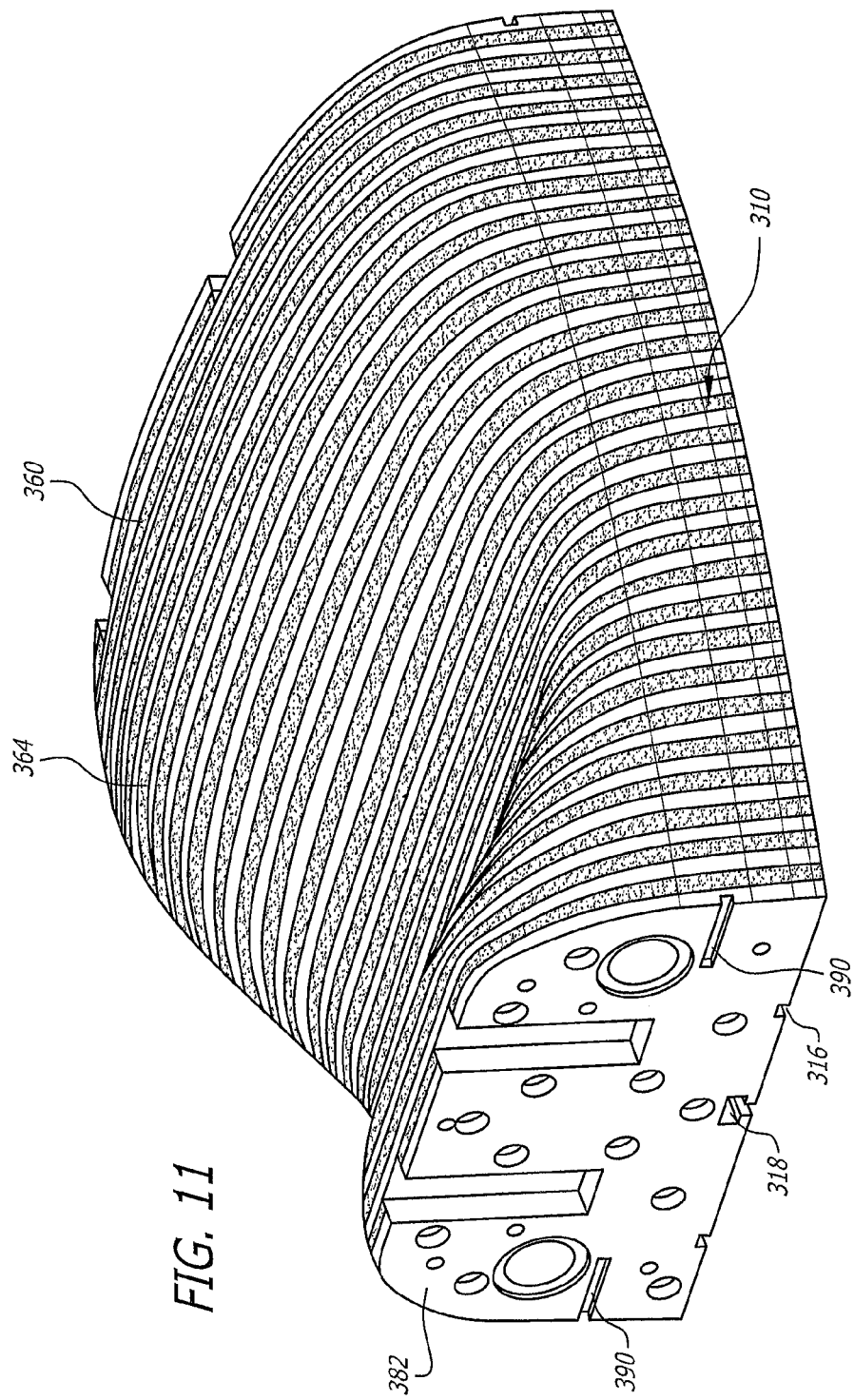

FIG. 11 is another schematic perspective view of the laminated die of

FIG. 10, according to an aspect of the disclosure.

FIG. 12 is a schematic perspective view of a part of the upper portion and a part of the lower portion of the die of FIG. 3, according to an aspect of the disclosure.

FIG. 13 is a schematic elevation view of the laminated die of FIG. 3, according to an aspect of the disclosure.

In the block diagram(s) referred to above, solid lines connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagram(s) may also exist. Dashed lines, if any, connecting the various elements and/or components represent couplings similar in function and purpose to those represented by solid lines; however, couplings represented by the dashed lines are either selectively provided or relate to alternative or optional aspects of the disclosure. Likewise, any elements and/or components, represented with dashed lines, indicate alternative or optional aspects of the disclosure. Environmental elements, if any, are represented with dotted lines

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Referring more particularly to the drawings, examples of the disclosure may be described in the context of an aircraft manufacturing and service method 100 as shown in FIG. 1 and an aircraft 102 as shown in FIG. 2. During pre-production, illustrative method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 to be placed in service 114. While in service by a customer, the aircraft 102 is scheduled for routine maintenance and service 116 (which may also include modification, reconfiguration, refurbishment, and so on).

Each of the processes of the illustrative method 100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

As shown in FIG. 2, the aircraft 102 produced by the illustrative method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the disclosure may be applied to other industries, such as the automotive industry and the ship-building industry, among others.

Apparatus and methods embodied herein may be employed during any one or more of the stages of the manufacturing and service method 100. For example, components or subassemblies corresponding to component and subassembly manufacturing 108 may be fabricated or manufactured in a manner similar to components or subassemblies produced while the aircraft 102 is in service. Also, one or more aspects of the apparatus, method, or a combination thereof may be utilized during the production stages 108 and 110, for example, by substantially expediting assembly of or reducing the cost of the aircraft 102. Similarly, one or more aspects of the apparatus, method, or a combination thereof may be utilized, for example and without limitation, while the aircraft 102 is in service, e.g., maintenance and service 116.

More particularly, described herein are methods of making dies and the dies formed using such techniques. In general, described herein are techniques to form laminated dies by forming plates from plate stock such that the plates can be assembled into a die having an upper portion and a lower portion. One plate in the assembly may be designated as the primary plate and the remaining plates may be designated as secondary plates. The secondary plates may be provided with weld holes through which the secondary plates may be welded to adjacent plates. By contrast, the primary plate need not be provided with weld holes. In one aspect, the weld holes of adjacent laminates are offset by a minimum distance.

The die may be assembled by welding adjacent plates together using welds, e.g., fillet welds or plug welds, in the weld holes. On a periodic basis during assembly of the die, a dimension of the die may be measured and compared to a design specification. If the dimension of the die is out of tolerance then a plate may be machined to reduce a thickness of the plate in order to bring the die back into tolerance with the design specification. This process may be repeated during assembly of the die from the laminates to ensure that the die remains within tolerance.

A finishing operation may be applied to the assembled plates to form opposing contoured surfaces which have complementary shapes. Additional features may be added to the die in order to facilitate alignment of the die plates and with a platen on which die may be mounted. The additional features may be incorporated into the die, either by machining the plates individually or by machining the die after assembly.

As illustrated in FIGS. 3-12, one example of the present disclosure relates to a die 300 including a primary plate 310 and secondary plates 330 (such as secondary plates 330A and 330B, illustrated in FIGS. 8A and 8B). The secondary plates 330 include through weld holes 332 formed along a direction. As shown, e.g., in FIGS. 8A and 8B, the through weld holes 332 of adjacent secondary plates 330 (e.g., the secondary plates 330A) do not overlap when viewed in the direction along which the though weld holes 332 are formed. The primary plate 310 is coupled to at least one secondary plate 330, abutting the primary plate 310, by first welds 334 located in the through weld holes 332. The secondary plates 330 abutting each other are coupled by second welds 336 located in the through weld holes 332. In some examples the weld holes 332 may be formed using conventional machining techniques.

Providing a minimum distance between the through weld holes 332 of adjacent secondary plates 330 ensures that there is sufficient material to form the second welds 336 (e.g., fillet welds) and to reduce any stress resulting from the welding operations.

Referring, e.g., to FIGS. 8A and 8B, in one aspect of the disclosure, which may include at least a portion of the subject matter of any of the preceding and/or following examples and aspects, the direction along which the weld holes 332 are formed is a first direction 340 and the weld holes 332 of the secondary plates 330 abutting each other are separated by a minimum distance in the second direction 342, substantially perpendicular to the first direction 340. In some aspects of the disclosure, the weld holes 332 may have a lateral dimension indicated by the reference "W", which is between about 1.0 inches (2.5 cm) and 3.0 inches (7.5 cm) to provide sufficient room to form the second welds 336 in the weld holes 332. The weld holes 332 of adjacent secondary plates 330 (e.g., the secondary plates 330A) may be offset in the second direction 342 by a minimum distance, indicated by the reference "D", which is between about 1.0 inches (2.5 cm) and 3.0 inches (7.5 cm) in order to provide a solid surface to weld in the weld holes 332.

Referring, e.g., to FIGS. 7-12, in one aspect of the disclosure, which may include at least a portion of the subject matter of any of the preceding and/or following examples and aspects, the primary plate 310 is between two of the secondary plates 330 and the primary plate 310 has no weld holes 332. Referring more particularly to FIG. 8A, in one aspect of the disclosure, which may include at least a portion of the subject matter of any of the preceding and/or following examples and aspects, the primary plate 310 includes a first side 320 and a second side 322. As illustrated, e.g., in FIGS. 8A and 9, in one aspect of the disclosure, which may include at least a portion of the subject matter of any of the preceding and/or following examples and aspects, a first plurality 330A of the secondary plates 330 is on the first side 320 of the primary plate 310, and a second plurality 330B of the secondary plates 330 is on the second side 322 of the primary plate 310.

In one aspect of the disclosure, which may include at least a portion of the subject matter of any of the preceding and/or following examples and aspects, all of the secondary plates 330 are on one side of the primary plate 310 such that the primary plate 310 forms a lateral face of the die (see, e.g., FIG. 8B).

Referring, e.g., to FIGS. 9-10, in one aspect of the disclosure, which may include at least a portion of the subject matter of any of the preceding and/or following examples and aspects, the secondary plates 330 include a first subset 350 of the secondary plates 330 and a second subset 352 of the secondary plates 330. In one aspect of the disclosure, which may include at least a portion of the subject matter of any of the preceding and/or following examples and aspects, at least one of the secondary plates 330 in the second subset 352 is thinner than at least one of the secondary plates 330 in the first subset 350. In another aspect of the disclosure, which may include at least a portion of the subject matter of any of the preceding and/or following examples and aspects, each of the secondary plates 330 in the second subset 352 is thinner than each of the secondary plates 330 in the first subset 350.

Referring, e.g., to FIGS. 9-11, in one aspect of the disclosure, which may include at least a portion of the subject matter of any of the preceding and/or following examples and aspects, the primary plate 310 and the secondary plates 330 form a predetermined three-dimensional shape 360, as illustrated, e.g., in FIG. 10. In one aspect of the disclosure, which may include at least a portion of the subject matter of any of the preceding and/or following examples and aspects, at least one of the secondary plates 330 has a different contour than the primary plate 310 and at least two of the secondary plates 330 have different contours such that the plates may form a complex three-dimensional surface.

Referring, e.g., to FIGS. 9-11, in one aspect of the disclosure, which may include at least a portion of the subject matter of any of the preceding and/or following examples and aspects, the die 300 also includes an alignment slot 316, which extends along a substantially flat surface 362 of the predetermined three-dimensional shape 360.

Referring, e.g., to FIG. 11, in one aspect of the disclosure, which may include at least a portion of the subject matter of any of the preceding and/or following examples and aspects, the die 300 also includes a linear slot 318 having a shaped cross-section, wherein the linear slot is formed in at least one of the secondary plates 330. In one aspect of the disclosure, which may include at least a portion of the subject matter of any of the preceding and/or following examples and aspects, the linear slot 318 is formed in the primary plate 310. In one aspect, the linear slot may be a linear T-shaped slot used to facilitate the installation of the die 300 on a press platen (not shown).

Referring, e.g., to FIGS. 12-13, in one aspect of the disclosure, which may include at least a portion of the subject matter of any of the preceding and/or following examples and aspects, the die 300 includes an upper die portion 370 and a lower die portion 380. The upper die portion 370 and the lower die portion 380 are discrete dies, and the upper die portion 370 and the lower die portion include complementary surfaces. In other words, the lower die portion 380 is separate from the upper die portion 370, and the upper die portion 370 and the lower die portion 380 are formed into complementary shapes. In one aspect of the disclosure, which may include at least a portion of the subject matter of any of the preceding and/or following examples and aspects, the weld holes 332 are separated from the complementary surfaces 378, 388 by a minimum distance, identified e.g., in FIG. 13, by a reference MIN. The minimum distance MIN may be, for example, between 1.75 about inches (4.4 cm) and 2.25 inches (5.7 cm) to ensure that final machining of the complementary surfaces of the die 300 does not result in undesirable penetration into the weld holes 332. In a further aspect, the weld holes 332 are separated from the complementary surfaces of the die 300 by a maximum distance, identified by a reference MAX in FIG. 13. The maximum distance MAX may be between about 2.25 inches (5.7 cm) and 2.5 inches (6.4 cm) to decrease flexing of the primary plate 310 and the secondary plates 330 relative to each other during operation of the die 300.

Referring, e.g., to FIG. 13, in one aspect of the disclosure, which may include at least a portion of the subject matter of any of the preceding and/or following examples and aspects, the upper die portion 370 includes an upper end plate 372 and the lower die portion 380 includes a lower end plate 382. The upper end plate 372 and the lower end plate 382 include an alignment slot 390, configured to receive an alignment-verification tool 392.

In one aspect of the disclosure, which may include at least a portion of the subject matter of any of the preceding and/or following examples and aspects, the lower die portion 380 includes at least one alignment feature 386 to align or locate a material blank on the lower die portion 380.

Referring, e.g., to FIG. 4, one example of the present disclosure relates to a method of making the die 300. The method includes shaping the primary plate 310 and the secondary plates 330 to have predetermined contours and forming weld holes 332 in the secondary plates 330 along a direction, wherein the weld holes 332 of the secondary plates 330 abutting each other do not overlap when viewed in the direction along which the weld holes 332 are formed. The method also includes assembling the die by coupling, in a predetermined order, the primary plate 310 and at least one secondary plate, abutting the primary plate 310, by first welds 334 located in the weld holes 332, and the secondary plates 330, abutting each other, by the second welds 334 located in the weld holes 332.

As illustrated in FIG. 5, in one aspect of the disclosure, which may include at least a portion of the subject matter of any of the preceding and/or following examples and aspects, shaping the primary plate 310 and the secondary plates 330 includes forming complementary shapes from plate stock 500. For example, the plate stock 500 may be cut using various techniques including, but not limited to, water-jet cutting, plasma cutting, laser cutting, or conventional metal machining techniques. The plate stock 500 may be cut into a first portion 510 and a second portion 520, which may correspond to the upper die portion 370 and the lower die portion 380 of the die 300 (illustrated, e.g., in FIGS. 12 and 13), such that the plates form complementary shapes. Forming the die plates in this manner improves the manufacturing efficiency, enhances the dimensional accuracy of the die, and reduces raw-material use.

As illustrated in FIG. 5, in some examples the plate stock 500 may include stainless steel plates, which have thickness that measures between about 0.5 inches (1.3 cm) and about 3 inches (7.6 cm). The plates 500 may have a height between about 10 inches (25 cm) and 30 inches (76 cm) and a width between about 30 inches (76 cm) and 120 inches (305 cm).

As shown, e.g., in FIG. 8A and FIG. 7, in one aspect of the disclosure, which may include at least a portion of the subject matter of any of the preceding and/or following examples and aspects, the secondary plates 330 are welded on opposing sides of the primary plate 310. Referring, e.g., to FIG. 8B, in another aspect of the disclosure, which may include at least a portion of the subject matter of any of the preceding and/or following examples and aspects, the secondary plates 330 are welded on one side of the primary plate 310 such that the primary plate 310 forms a lateral face of the die 300.

In one aspect of the disclosure, which may include at least a portion of the subject matter of any of the preceding and/or following examples and aspects, assembling the die further includes periodically measuring a length dimension of the die and reducing a thickness of one of the secondary plates 330 when the length dimension of the die exceeds a target length dimension. Referring back to FIG. 4, at operation 430 a length dimension of the die 300 may be measured on a periodic basis. For example, a length dimension may be measured after a predetermined number of secondary plates 330 have been welded onto the die 300 or when the die 300 reaches a particular dimension. At operation 435 the length of the die 300 may be compared to a design specification. If, at operation 435, the length of the die 300 is within tolerance, then control passes to operation 445. If, at operation 445, assembly of the die 300 is not finished, then operation 425 is repeated and another secondary plate is welded onto the die 300. By contrast, if at operation 445 the die 300 is finished, then control passes to operation 450, which includes machining the predetermined three-dimensional shape 360 to form a contoured surface 364 (FIG. 11).

In some examples the plates 310, 330 may be flattened in a forming press prior to welding to reduce distortion of the plates prior to welding. Assembly of the die 300 may begin by welding a first secondary plate 330 onto a first side of the primary plate 310, then welding a second secondary plate 330 onto the opposing side of the primary plate 310. Prior to welding, the plates 310, 330 may be aligned using the alignment slots 316, e.g., by mounting the plates 310, 330 on a platform which has alignment keys that mate with alignment slots 316. The plates 310, 330 may be clamped together prior to welding. Once a secondary plate 330 has been welded to each side of the primary plate 310, additional secondary plates 330 may be welded onto existing secondary plates 330 in an alternating fashion to reduce distortion of the die due to welding.

In one aspect of the disclosure, which may include at least a portion of the subject matter of any of the preceding and/or following examples and aspects, the method also includes forming the alignment slot 316 in the primary plate 310 and the secondary plates 330, wherein alignment slots extends along a substantially flat portion of the die 300. The alignment slot 316 may be formed, e.g., by a subtractive machining operation, such as grinding or milling.

In one aspect of the disclosure, which may include at least a portion of the subject matter of any of the preceding and/or following examples and aspects, the method also includes forming the linear T-shaped slot 318 in at least one of the secondary plates 330. In one aspect of the disclosure, which may include at least a portion of the subject matter of any of the preceding and/or following examples and aspects, the linear T-shaped slot is formed in the primary plate 310, as shown in FIG. 11.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Having the benefit of the teachings presented in the foregoing description and the associated drawings, many modifications of the disclosed subject matter will become apparent to one skilled in the art to which this disclosure pertains. Therefore, it is to be understood that the disclosure is not to be limited to the specific examples and aspects provided and that modifications thereof are intended to be within the scope of the appended claims. Moreover, although the foregoing disclosure and the associated drawings describe certain illustrative combinations of elements and/or functions, it should be appreciated that different combinations of elements and/or functions may be realized without departing from the scope of the appended claims. In the description and claims, the terms coupled and connected, along with their derivatives, may be used. In particular examples, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although aspects of the disclosure have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A die, comprising:
   a primary plate; and
   secondary plates comprising through weld holes formed along a direction, wherein:
      the through weld holes of adjacent secondary plates do not overlap when viewed in the direction,
      the primary plate is coupled to at least one secondary plate abutting the primary plate by first welds located in the through weld holes, and
      the secondary plates abutting each other are coupled by second welds located in the through weld holes.

2. The die of claim 1, wherein the primary plate is between two of the secondary plates.

3. The die of claim 1, wherein the direction is a first direction and wherein the weld holes of the secondary plates abutting each other are separated by a minimum distance in the second direction substantially perpendicular to the first direction.

4. The die of claim 1, wherein the primary plate comprises a first side and a second side, and wherein:
   a first plurality of the secondary plates is on the first side of the primary plate; and
   a second plurality of the secondary plates is on the second side of the primary plate.

5. The die of claim 1, wherein the secondary plates comprise:
   a first subset of the secondary plates; and
   a second subset of the secondary plates,
   wherein at least one of the secondary plates in the second subset is thinner than at least one of the secondary plates in the first subset.

6. The die of claim 5, wherein each of the secondary plates in the second subset is thinner than each of the secondary plates in the first subset.

7. The die of claim 1, wherein the primary plate and the secondary plates form a predetermined three-dimensional shape.

8. The die of claim 7 further including an alignment slot, wherein the predetermined three-dimensional shape further includes a substantially flat surface and the alignment slot extends along the substantially flat surface.

9. The die of claim 1, further comprising a linear slot having a shaped cross-section, wherein the linear slot is formed in at least one of the secondary plates.

10. The die of claim 1, wherein the die comprises an upper die portion and a lower die portion, the upper die portion and the lower die portion being discrete dies, and wherein the upper die portion and the lower die portion include complementary surfaces.

11. The die of claim 10, wherein the weld holes are separated from the complementary surfaces by a minimum distance.

12. The die of claim 10, wherein:
   the upper die portion comprises an upper end plate;
   the lower die portion comprises a lower end plate; and
   the upper end plate and the lower end plate comprise an alignment slot configured to receive an alignment-verification tool.

13. The die of claim 12, wherein the lower die comprises an alignment feature to locate a material blank on the lower die.

14. A method of making a die, the method comprising:
- shaping a primary plate and secondary plates to have predetermined contours;
- forming weld holes in the secondary plates along a direction, wherein the weld holes of the secondary plates abutting each other do not overlap when viewed in the direction; and
- assembling the die by coupling, in a predetermined order:
  - the primary plate and at least one secondary plate abutting the primary plate by first welds located in the weld holes, and
  - the secondary plates abutting each other by second welds located in the weld holes.

15. The method of claim 14, wherein shaping the primary plate and the secondary plates comprises forming complementary shapes from plate stock.

16. The method of claim 14, wherein assembling the die further includes periodically measuring a length dimension of the die and reducing a thickness of one of the secondary plates when the length dimension of the die exceeds a target length dimension.

17. The method of claim 14, further comprising machining the predetermined three-dimensional shape to form a contoured surface.

18. The method of claim 14, further comprising forming an alignment slot in the primary plate and the secondary plates, wherein alignment slots extends along a substantially flat portion of the die.

19. The method of claim 14, further comprising forming a linear T-shaped slot in at least one of the secondary plates.

20. The method of claim 19, wherein the linear T-shaped slot is formed in the primary plate.

\* \* \* \* \*